(12) United States Patent
Dayal et al.

(10) Patent No.: US 9,252,862 B2
(45) Date of Patent: Feb. 2, 2016

(54) MIMO PREAMBLE FOR INITIAL ACCESS WITH AN UNKNOWN NUMBER OF TRANSMIT ANTENNAS

(75) Inventors: Pranav Dayal, San Diego, CA (US); Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1180 days.

(21) Appl. No.: 12/211,861

(22) Filed: Sep. 17, 2008

(65) Prior Publication Data

US 2010/0067599 A1    Mar. 18, 2010

(51) Int. Cl.
*H04B 7/06*     (2006.01)
*H04L 27/26*    (2006.01)

(52) U.S. Cl.
CPC ............ *H04B 7/0667* (2013.01); *H04L 27/261* (2013.01)

(58) Field of Classification Search
USPC .................................. 375/260, 267; 370/328
See application file for complete search history.

(56) References Cited

U.S. PATENT DOCUMENTS

| | | | | |
|---|---|---|---|---|
| 5,331,329 A * | 7/1994 | Volkov | ................. | G01S 19/02 |
| | | | | 342/357.395 |
| 5,949,812 A * | 9/1999 | Turney | ................. | G01S 19/34 |
| | | | | 370/311 |
| 6,246,698 B1 * | 6/2001 | Kumar | ................. | H04H 20/22 |
| | | | | 370/487 |
| 6,907,270 B1 * | 6/2005 | Blanz | ................. | 455/562.1 |
| 7,885,177 B2 * | 2/2011 | Kopmeiners et al. | ......... | 370/208 |
| 2001/0050926 A1 * | 12/2001 | Kumar | ................. | H04H 20/30 |
| | | | | 370/529 |
| 2005/0030229 A1 * | 2/2005 | Spilker | ................. | G01S 5/0036 |
| | | | | 342/385 |
| 2005/0099334 A1 * | 5/2005 | Roh | ................. | G01S 19/09 |
| | | | | 342/357.59 |
| 2005/0141407 A1 * | 6/2005 | Sandhu | ................. | 370/203 |
| 2005/0157806 A1 * | 7/2005 | Walton et al. | ................. | 375/267 |
| 2005/0180353 A1 * | 8/2005 | Hansen et al. | ................. | 370/328 |
| 2005/0181728 A1 * | 8/2005 | Hansen et al. | ................. | 455/41.2 |
| 2005/0181800 A1 * | 8/2005 | Trachewsky et al. | ........ | 455/452.1 |
| 2005/0276347 A1 * | 12/2005 | Mujtaba et al. | ................. | 375/299 |
| 2005/0286562 A1 | 12/2005 | Nakao et al. | | |

(Continued)

FOREIGN PATENT DOCUMENTS

| | | |
|---|---|---|
| CN | 1977484 A | 6/2007 |
| EP | 1892865 | * 2/2008 |

(Continued)

OTHER PUBLICATIONS

Taiwan Search Report—TW098131414—TIPO—Sep. 24, 2012.

(Continued)

*Primary Examiner* — Chieh M Fan
*Assistant Examiner* — Sarah Hassan
(74) *Attorney, Agent, or Firm* — Liberty E. Mann (57) ABSTRACT

For certain embodiments, a preamble sequence associated with a particular number of transmit antennas may allow a receiving mobile station to determine the number of transmit antennas used for transmission. The preamble sequence may be selected from one of a set of Constant Amplitude and Zero Auto Correlation (CAZAC) sequences corresponding to all of the supported number of transmit antennas. As a result, a receiving station may be able to determine the sequence sent by correlation and, thereby determine the number of antennas used for transmission. Given the number of transmit antennas, the mobile station may then perform MIMO channel estimation during initial synchronization to recover the channel taps between each transmit and each receive antenna.

17 Claims, 9 Drawing Sheets

(56) References Cited

U.S. PATENT DOCUMENTS

| | | | |
|---|---|---|---|
| 2006/0034385 A1* | 2/2006 | Egashira et al. | 375/267 |
| 2006/0050799 A1* | 3/2006 | Hou et al. | 375/260 |
| 2006/0056528 A1* | 3/2006 | Jung et al. | 375/260 |
| 2006/0193407 A1* | 8/2006 | Dibiaso et al. | 375/343 |
| 2008/0002780 A1* | 1/2008 | Yu et al. | 375/267 |
| 2009/0027261 A1* | 1/2009 | Martin | G01S 19/07 342/357.44 |
| 2009/0028065 A1* | 1/2009 | Iwai et al. | 370/252 |
| 2009/0225885 A1* | 9/2009 | Aoki et al. | 375/260 |
| 2009/0285319 A1* | 11/2009 | Zhang et al. | 375/260 |
| 2010/0054225 A1* | 3/2010 | Hadef | G01S 19/02 370/342 |

FOREIGN PATENT DOCUMENTS

| | | |
|---|---|---|
| JP | 2006054661 A | 2/2006 |
| JP | 2006211726 A | 8/2006 |
| JP | 2008500783 A | 1/2008 |
| KR | 20060023863 A | 3/2006 |
| WO | WO-2007142233 A1 | 12/2007 |

OTHER PUBLICATIONS

International Search Report—PCT/US2009/056423—International Search Authority, European Patent Office, Dec. 28, 2009.

Written Opinion—PCT/US2009/056423, International Search Authority, European Patent Office Dec. 28, 2009.

* cited by examiner

MIMO PREAMBLE FOR INITIAL ACCESS WITH AN UNKNOWN NUMBER OF TRANSMIT ANTENNAS

TECHNICAL FIELD

The present disclosure generally relates to MIMO communication systems and, more specifically, to a method for determining the number of transmit antennas used at the base station during the initial synchronization with mobile subscriber.

BACKGROUND

Multiple-input multiple-output (MIMO) wireless communications systems utilize multiple transmit and receive antennas to achieve transmit and receiver diversity, which may allow for more reliable communications and/or improved data throughput. While multiple transmit antennas are available, the preamble or the primary synchronization signal in a MIMO system is typically transmitted to the mobile subscriber by utilizing only one effective transmit antenna at the base station. This is due to the fact that during the initial access the subscriber does not know the number of antennas at the base station. As a result, the transmission diversity as an inherent feature for a plurality of antennas is not utilized during the initial access.

In the developing of IEEE 802.16m standard, a broadcast channel (BCH) needs to be decoded by the mobile subscriber following its primary synchronization with the base station. The BCH may contain system-wide parameters in order to enable the initial access. In addition, the BCH may be transmitted by utilizing a plurality of transmit antennas. Instead of providing pilots for the BCH message, cyclic delay diversity (CDD) scheme may be utilized to transmit delayed copies of a preamble from multiple antennas. To accomplish this, information about the number of transmit antennas utilized by the base station and channel estimates need to be obtained before decoding the BCH message.

Therefore, there is a need in the art for conveying the number of transmit antennas that are utilized at the base station, ideally during primary synchronization with the mobile subscriber.

SUMMARY

Certain embodiments of the present disclosure provide for methods, systems, apparatuses and computer-program products for wireless communications in a multiple input multiple output (MIMO) communications system. The method generally includes decoding a preamble sequence based on symbols received from a plurality of receive antennas and determining, based on the decoded preamble sequence, a number of transmit antennas used to transmit the preamble sequence.

Certain embodiments of the present disclosure provide for methods, systems, apparatuses and computer-program products for wireless communications in a multiple input multiple output (MIMO) communications system. The method generally includes determining a number of transmit antennas to use for a transmission, selecting, from a plurality of preamble sequences corresponding to different numbers of transmit antennas, a preamble sequence corresponding to the determined number of transmit antennas, and transmitting the selected preamble sequence from the determined number of transmit antennas.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

For certain embodiments of the present disclosure, a base station may apply transmit diversity during primary synchronization by transmitting a preamble sequence from a plurality of transmit antennas. The preamble sequence may be selected to convey the number of transmit antennas used during the transmission. As a result, after properly decoding the preamble sequence, a receiving mobile station (or subscriber station) may know the number of antennas used at the base station allowing for channel estimation. Thus, certain embodiments that may allow the benefits of transmit diversity may be achieved when transmitting the primary synchronization signal, such as a 802.16m broadcast channel (BCH) that may contain system-wide parameters used for system access.

By reserving a set of preamble sequences, each associated with a different number of transmit antennas used at the base station, a mobile station may simultaneously obtain synchronization and determine the number of transmit antennas. With knowledge of the number of transmit antennas, the mobile station may perform MIMO channel estimation, for example, based on knowledge of the transmission scheme (e.g., CDD) used to transmit the preamble sequence.

The word "exemplary" is used herein to mean "serving as an example, instance, or illustration." Any embodiment described herein as "exemplary" is not necessarily to be construed as preferred or advantageous over other embodiments.

The techniques described herein may be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, Spatial Division Multiple Access (SDMA) systems, wireless local area networks (WLANs), etc. The terms "system" and "network" are often used interchangeably. An OFDMA system may implement an air interface such as Ultra Mobile Broadband (UMB), Evolved UTRA (E-UTRA), IEEE 802.11 (which is also referred to as Wi-Fi), IEEE 802.16 (which is also referred to as WiMAX), IEEE 802.20, Flash-OFDM®, etc. These various air interfaces and standards are known in the art.

For clarity, certain aspects of the techniques are described below for WiMAX, and WiMAX terminology is used in much of the description below. WiMAX is described in IEEE 802.16, entitled "Part 16: Air Interface for Fixed and Mobile Broadband Wireless Access Systems," dates Oct. 1, 2004, and in IEEE 802.16e, entitled "Part 16: Air Interface for Fixed and Mobile Broadband Wireless Access Systems; Amendment 2: Physical and Medium Access Control Layers for Combined Fixed and Mobile Operation in Licensed Bands," dates Feb. 28, 2006. These documents are publicly available. The techniques may also be used for IEEE 802.16m, which is a new air interface being developed for WiMAX.

Figure 1:
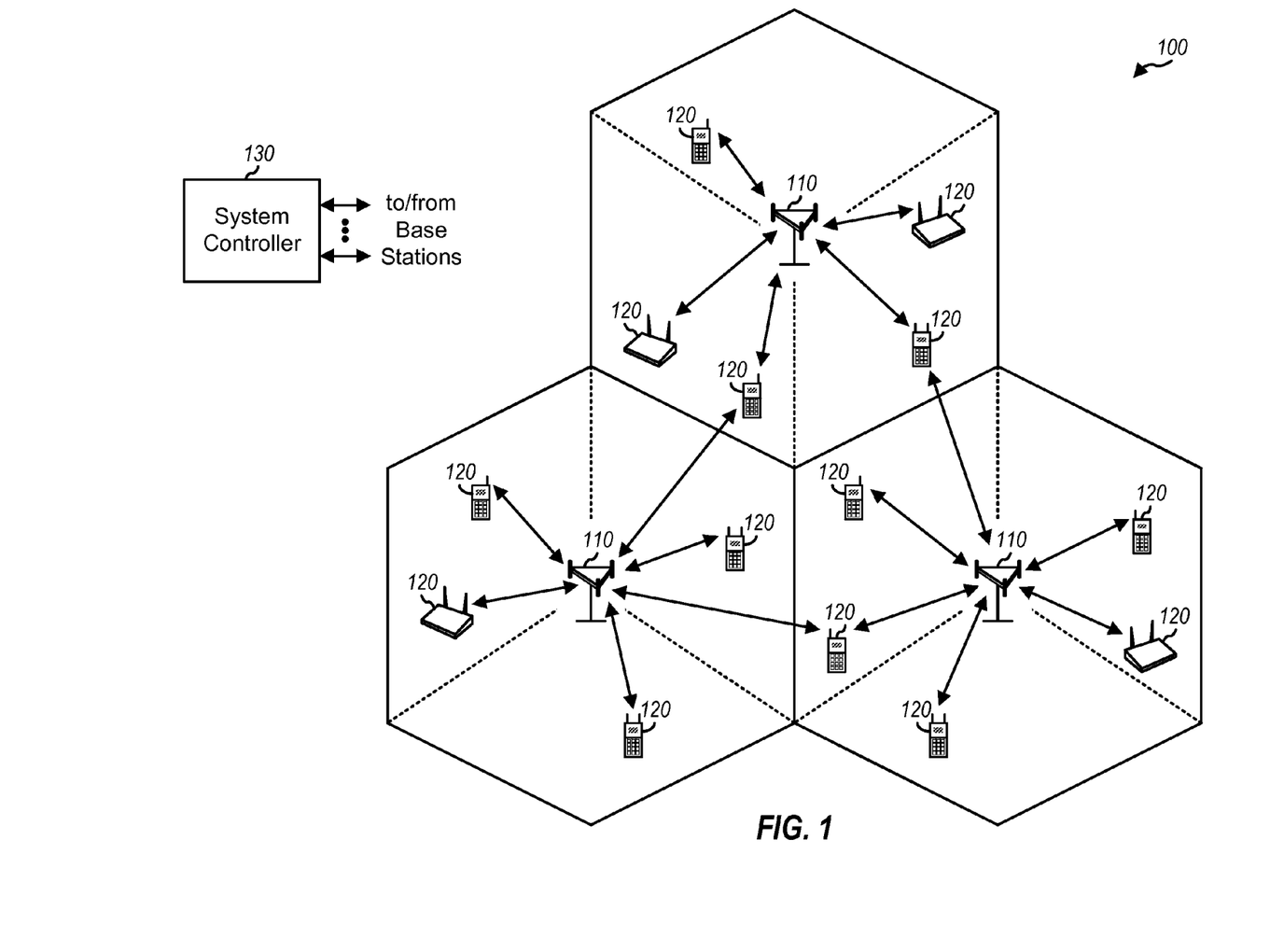
FIG. 1 illustrates a wireless communication system with multiple base stations and multiple subscriber stations in accordance with certain embodiments of the present disclosure.

FIG. 1 shows a wireless communication system 100 with multiple base stations (BS) 110 and multiple subscriber station (SS) 120. A base station is a station that supports communication for subscriber stations and may perform functions such as connectivity, management, and control of subscriber stations. A base station may also be referred to as a Node B, an evolved Node B, an access point, etc. A system controller 130 may couple to base stations 110 and provide coordination and control for these base stations.

Subscriber stations 120 may be dispersed throughout the system, and each subscriber station may be stationary or mobile. A subscriber station may also be referred to as a mobile station, a terminal, an access terminal, user equipment, a subscriber unit, subscriber station, etc. A subscriber station may be a cellular phone, a personal digital assistant (PDA), a wireless device, a wireless modem, a handheld device, a laptop computer, a cordless phone, etc. A subscriber station may communicate with a base station on the downlink (DL) and/or uplink (UL). The downlink (or forward link) refers to the communication link from the base station to the subscriber station, and the uplink (or reverse link) refers to the communication link from the subscriber station to the base station.

Figure 2:
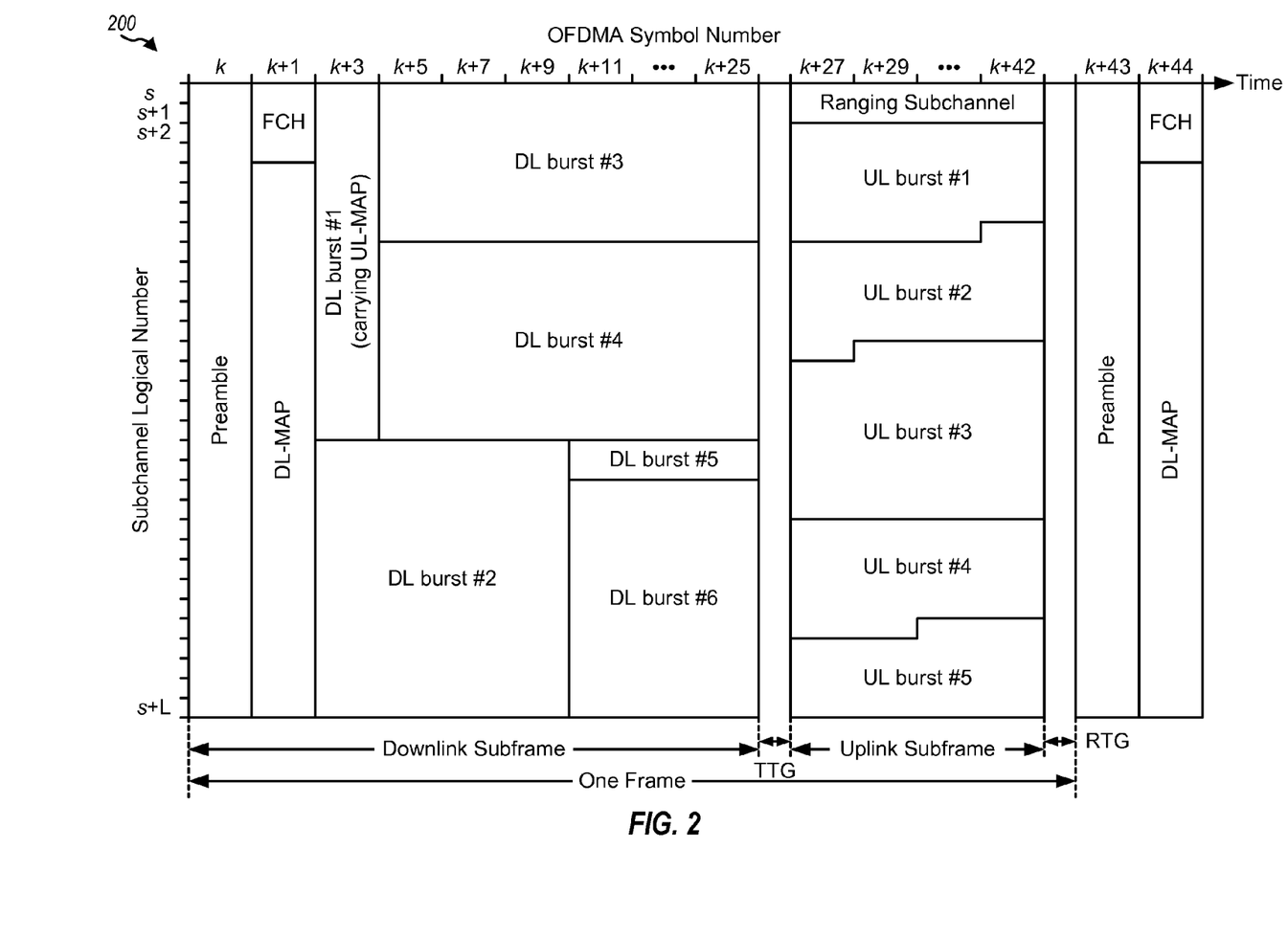
FIG. 2 illustrates an example frame structure for a time division duplex (TDD) mode in IEEE 802.16 in accordance with certain embodiments of the present disclosure.

FIG. 2 shows an example frame structure 200 for a time division duplex (TDD) mode in IEEE 802.16. The transmission timeline may be partitioned into units of frames. Each frame may span predetermined time duration, e.g., 5 milliseconds (ms), and may be partitioned into a downlink subframe and an uplink subframe. In general, the downlink and uplink subframes may cover any fraction of a frame. The downlink and uplink subframes may be separated by a transmit transmission gap (TTG) and a receive transmission gap (RTG).

A number of physical subchannels may be defined. Each physical subchannel may include a set of subcarriers that may be contiguous or distributed across the system bandwidth. A number of logical subchannels may also be defined and may be mapped to the physical subchannels based on a known mapping. The logical subchannels may simplify the allocation of resources.

As shown in FIG. 2, a downlink subframe may include a preamble, a frame control header (FCH), a downlink map (DL-MAP), an uplink map (UL-MAP), and downlink (DL) bursts. The preamble may carry a known transmission that may be used by subscriber stations for frame detection and synchronization. The FCH may carry parameters used to receive the DL-MAP, the UL-MAP, and the downlink bursts. The DL-MAP may carry a DL-MAP message, which may include information elements (IEs) for various types of control information (e.g., resource allocation or assignment) for downlink access. The UL-MAP may carry a UL-MAP message, which may include IEs for various types of control information for uplink access. The downlink bursts may carry data for the subscriber stations being served. An uplink subframe may include uplink bursts, which may carry data transmitted by the subscriber stations scheduled for uplink transmission.

The preamble transmission techniques described herein may be used for multiple-input multiple-output (MIMO) transmission as well as multiple-input single-output transmission (MISO) transmission. The techniques may also be used for preamble transmission on the downlink as well as the uplink. For clarity, certain aspects of the techniques are described below for preamble transmission on the downlink with MIMO.

Figure 3:
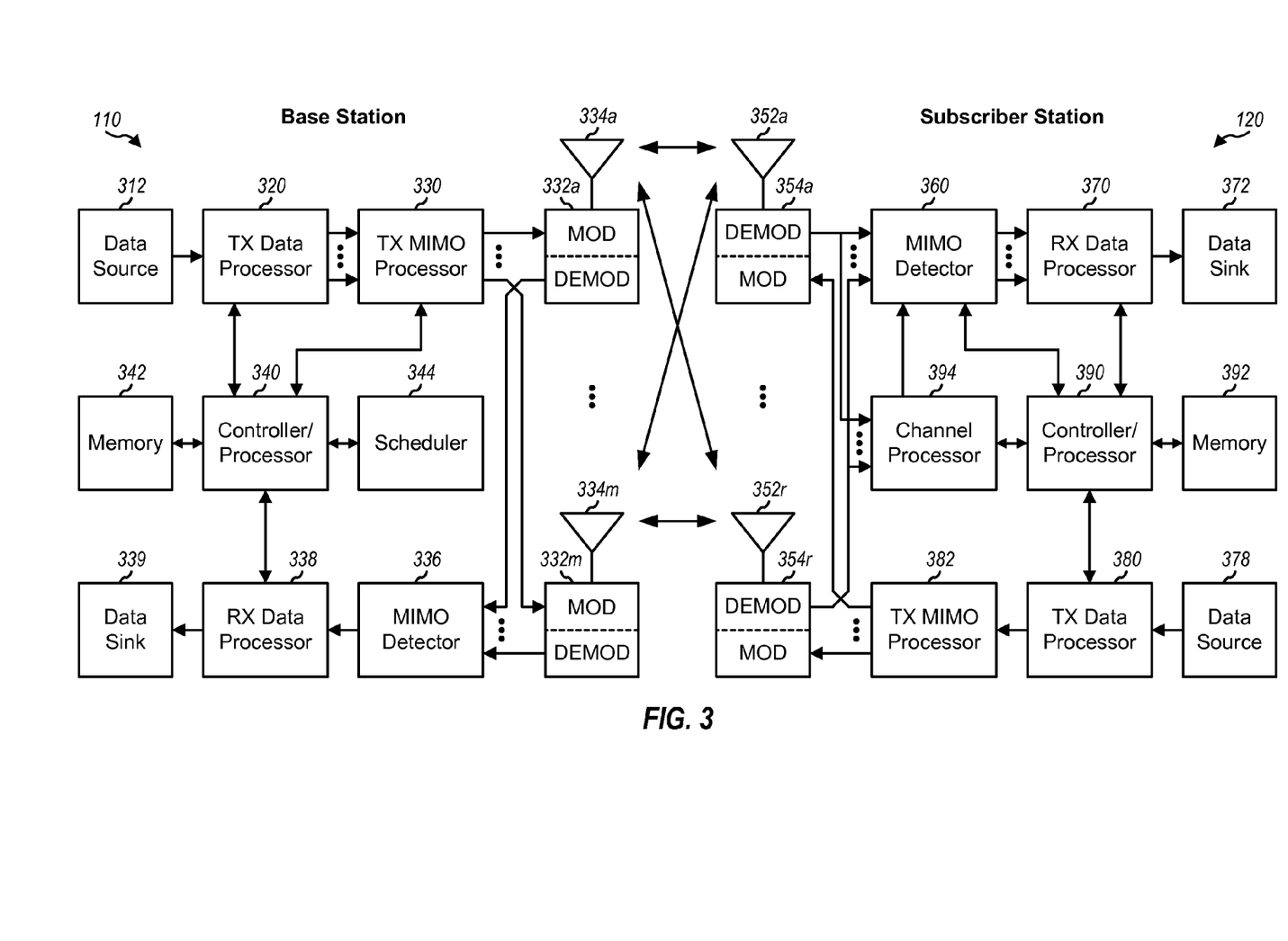
FIG. 3 illustrates an example block diagram of a design of a base station and a subscriber station, in accordance with certain embodiments of the present disclosure.

FIG. 3 shows a block diagram of a design of a base station 110 and a subscriber station 120, which are one of the base stations and one of the subscriber stations in FIG. 1. Base station 110 is equipped with multiple (M) antennas 334a through 334m. Subscriber station 120 is equipped with multiple (R) antennas 352a through 352r.

At base station 110, transmit (TX) data processor 320 may receive data from a data source 312, process (e.g., encode and symbol map) the data based on one or more modulation and coding schemes, and provide data symbols. As used herein, a data symbol is a symbol for data, a preamble symbol is a symbol for preamble, and a symbol may be a real or complex value. The data and preamble symbols may be modulation symbols from a modulation scheme such as PSK or QAM. The preamble (or pilot signal, in general) may comprise data that are known a priori by both the base station and the subscriber station. A TX MIMO processor 330 may process the data and pilot symbols and provide M output symbol streams to M modulators (MOD) 332a through 332m. Each modulator 332 may process its output symbol stream (e.g., for OFDM) to obtain an output sample stream. Each modulator 332 may further condition (e.g., convert to analog, filter, amplify, and upconvert) its output sample stream and generate a downlink signal. The M downlink signals from modulators 332a through 332m may be transmitted via antennas 334a through 334m, respectively.

At subscriber station 120, R antennas 352a through 352r may receive the M downlink signals from base station 110, and each antenna 352 may provide a received signal to an associated demodulator (DEMOD) 354. Each demodulator 354 may condition (e.g., filter, amplify, downconvert, and digitize) its received signal to obtain input samples and may further process the input samples (e.g., for OFDM) to obtain received symbols. Each demodulator 354 may provide received data symbols to a MIMO detector 360 and provide the received pilot symbols to a channel processor 394. Channel processor 394 may estimate the response of a MIMO channel from base station 110 to subscriber station 120 based on the received pilot symbols and provide a MIMO channel estimate to MIMO detector 360. MIMO detector 360 may perform MIMO detection on the received symbols based on the MIMO channel estimate and provide detected symbols, which are estimates of the transmitted data symbols. A receive (RX) data processor 370 may process (e.g., symbol demap and decode) the detected symbols and provide decoded data to a data sink 372.

Subscriber station 120 may evaluate the channel conditions and generate feedback information, which may comprise various types of information. The feedback information and data from a data source 378 may be processed (e.g., encoded and symbol mapped) by a TX data processor 380, spatially processed by a TX MIMO processor 382, and further processed by modulators 354a through 354r to generate R uplink signals, which may be transmitted via antennas 352a through 352r. At base station 110, the R uplink signals from subscriber station 120 may be received by antennas 334a through 334m, processed by demodulators 332a through 332m, spatially processed by a MIMO detector 336, and further processed (e.g., symbol demapped and decoded) by an RX data processor 338 to recover the feedback information and data sent by subscriber station 120. Controller/processor 340 may control data transmission to subscriber station 120 based on the feedback information.

Controllers/processors 340 and 390 may direct the operation at base station 110 and subscriber station 120, respectively. Memories 342 and 392 may store data and program codes for base station 110 and subscriber station 120, respectively. A scheduler 344 may schedule subscriber station 120 and/or other subscriber stations for data transmission on the downlink and/or uplink based on the feedback information received from all subscriber stations.

IEEE 802.16 utilizes orthogonal frequency division multiplexing (OFDM) for the downlink and uplink. OFDM partitions the system bandwidth into multiple ($N_{FFT}$) orthogonal subcarriers, which may also be referred to as tones, bins, etc. Each subcarrier may be modulated with data or pilot. The number of subcarriers may be dependent on the system bandwidth as well as the frequency spacing between adjacent subcarriers. For example, $N_{FFT}$ may be equal to 128, 256, 512, 1024 or 2048. Only a subset of the $N_{FFT}$ total subcarriers may be usable for transmission of data and pilot, and the remaining subcarriers may serve as guard subcarriers to allow the system to meet spectral mask requirements. In the following description, a data subcarrier is a subcarrier used for data, and a pilot subcarrier is a subcarrier used for pilot. An OFDM symbol may be transmitted in each OFDM symbol period (or simply, a symbol period). Each OFDM symbol may include data subcarriers used to send data, pilot subcarriers used to send pilot, and/or guard subcarriers not used for data or pilot.

Figure 4:
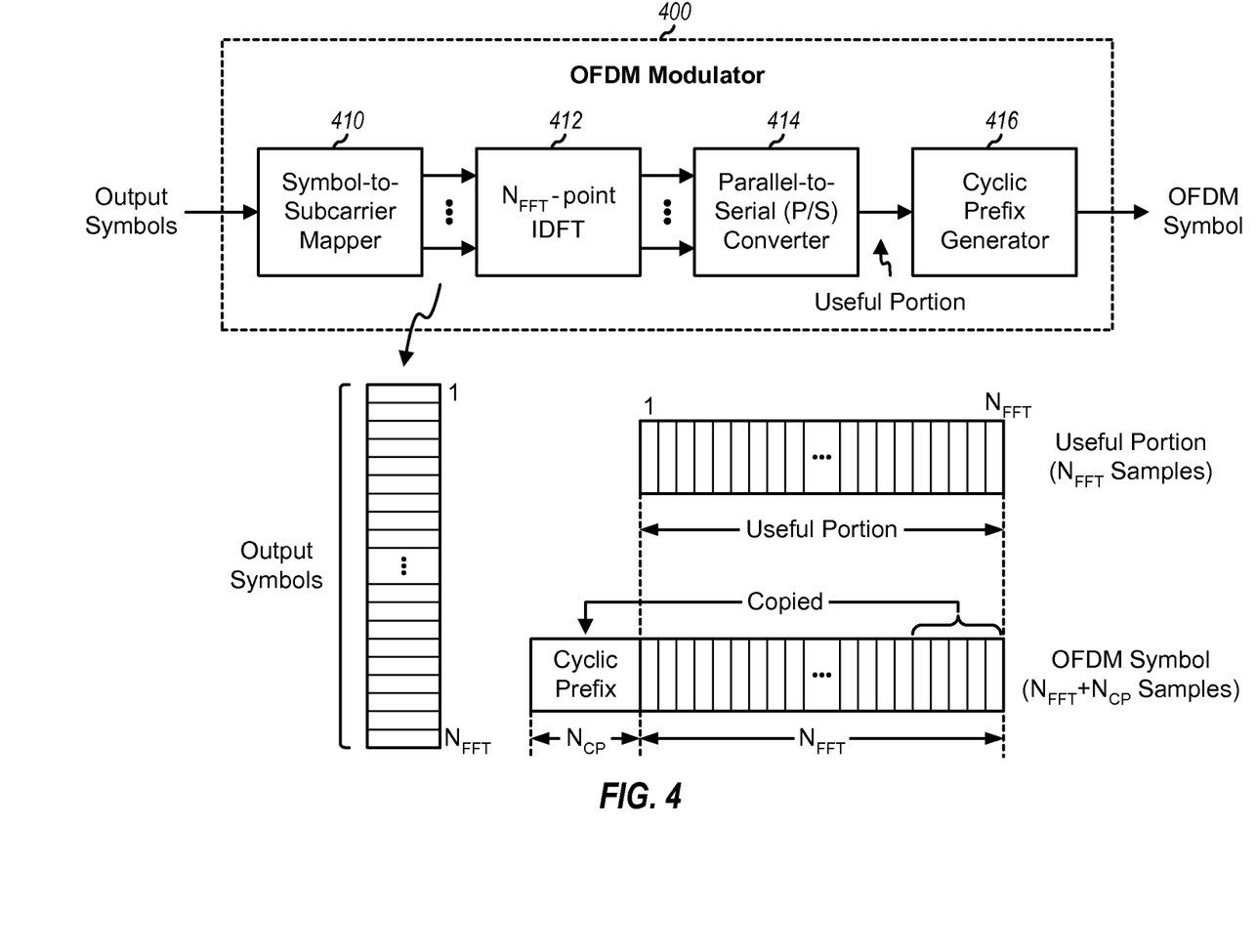
FIG. 4 illustrates a block diagram of a design of an OFDM modulator in accordance with certain embodiments of the present disclosure.

FIG. 4 shows a block diagram of a design of an OFDM modulator 400, which may be included in each of modulators 332a through 332m and modulators 354a through 354r in FIG. 3. Within OFDM modulator 400, a symbol-to-subcarrier mapper 410 receives and maps output symbols to the $N_{FFT}$ total subcarriers. In each OFDM symbol period, a unit 412 transforms $N_{FFT}$ output symbols for the $N_{FFT}$ total subcarriers to the time domain with an $N_{FFT}$-point inverse discrete Fourier transform (IDFT) and provides a useful portion containing $N_{FFT}$ time-domain samples. Each sample is a complex value to be transmitted in one chip period. A parallel-to-serial (P/S) converter 414 serializes the $N_{FFT}$ samples in the useful portion. A cyclic prefix generator 416 copies the last $N_{CP}$ samples of the useful portion and appends these $N_{CP}$ samples to the front of the useful portion to form an OFDM symbol containing $N_{FFT}+N_{CP}$ samples. Each OFDM symbol thus contains a useful portion of $N_{FFT}$ samples and a cyclic prefix of $N_{CP}$ samples. The cyclic prefix is used to combat intersymbol interference (ISI) and inter-carrier interference (ICI) caused by delay spread in a wireless channel.

Referring back to FIG. 3, on the downlink, a MIMO channel is formed by the M transmit antennas at base station 110 and the R receive antennas at subscriber station 120. This MIMO channel is composed of M·R single-input single-output (SISO) channels or one SISO channel for each possible pair of transmit and receive antennas. The channel response for each SISO channel may be characterized by either a time-domain channel impulse response or a corresponding frequency-domain channel frequency response. The channel frequency response is the discrete Fourier transform (DFT) of the channel impulse response.

The channel impulse response for each SISO channel may be characterized by L time-domain channel taps, where L is typically much less than $N_{FFT}$. That is, if an impulse is applied at a transmit antenna, then L time-domain samples at the sample rate taken at a receive antenna for this impulse stimulus would be sufficient to characterize the response of the SISO channel. The required number of channel taps (L) for the channel impulse response is dependent on the delay spread of the system, which is the time difference between the earliest and latest arriving signal instances of sufficient energy at the receive antenna.

Each SISO channel may include one or more propagation paths between the transmit antenna and the receive antenna for that SISO channel, with the propagation paths being determined by the wireless environment. Each path may be associated with a particular complex gain and a particular delay. For each SISO channel, the complex gains of the L channel taps are determined by the complex gains of the paths for that SISO channel. Each SISO channel thus has a channel profile with paths $d_0$ through $d_{L-1}$, where the complex gain of each path $d_l$ may be a zero or non-zero value.

Exemplary Cyclic Delay Diversity

As described herein, for certain embodiments, a base station may apply transmit diversity during primary synchronization by transmitting a preamble sequence from a plurality of transmit antennas. The particular preamble sequence may be selected to indicate the number of transmit antennas used to transmit the sequence. As a result, a mobile station may simultaneously obtain synchronization and determine the number of transmit antennas. With knowledge of the number of transmit antennas, the mobile station may perform MIMO channel estimation based on knowledge of the transmission scheme used to transmit the preamble sequence.

For certain embodiments, a cyclic delay diversity (CDD) scheme may be used to transmit the preamble sequence from the base station. Cyclic delay diversity (CDD) may be used to create frequency diversity in a MIMO transmission, which may improve error rate performance. With cyclic delay diversity, the OFDM symbols for each transmit antenna may be cyclically delayed by a different amount, as described below. M different cyclically delayed signals may be transmitted from the M transmit antennas. However, cyclic delay diversity may adversely impact MIMO channel estimation in some instances. In particular, it may not be possible to separate paths if a cyclically delayed signal matches a path delay in the channel profile. For example, for a given receive antenna, it may not be possible to determine whether a complex gain for a delay of two samples is from (i) a downlink signal from the first transmit antenna with no cyclic delay and received via a path with a delay of two samples, or (ii) a downlink signal from the second transmit antenna with a cyclic delay of one sample and received via a path with a delay of one sample, or (iii) a downlink signal from the third transmit antenna with a cyclic delay of two samples and received via a path with no delay.

If the channel profile has paths $d_0$ through $d_{L-1}$ and if the M downlink signals from the M transmit antennas have cyclic delays of $t_0$ through $t_{M-1}$, then the L channel taps for each SISO channel may be determined without ambiguity if $(d_l + t_m)$ mod $T_S$ is distinct for all values of indices l and m, where $l=0, \ldots, L-1, m=0, \ldots, M-1$, $T_S$ is the duration of the useful portion and may be equal to $N_{FFT}$ samples, and "mod" denotes a modulo operation. This condition is applicable for full frequency reuse.

In one embodiment of the present disclosure, the cyclic delay $t_m$ for each transmit antenna (except for one transmit antenna with cyclic delay of zero) may be selected to be greater than the maximum expected delay spread in the system. The cyclic prefix length $N_{CP}$ may be selected such that it is greater than the maximum expected delay spread in the system, so that $L \leq N_{CP}$. Thus, the cyclic delay for each transmit antenna may be selected to be an integer multiple of the cyclic prefix length, as follows:

$$t_m = m \cdot N_{CP}, \text{ for } m=0, \ldots, M-1 \tag{1}$$

Figure 5:
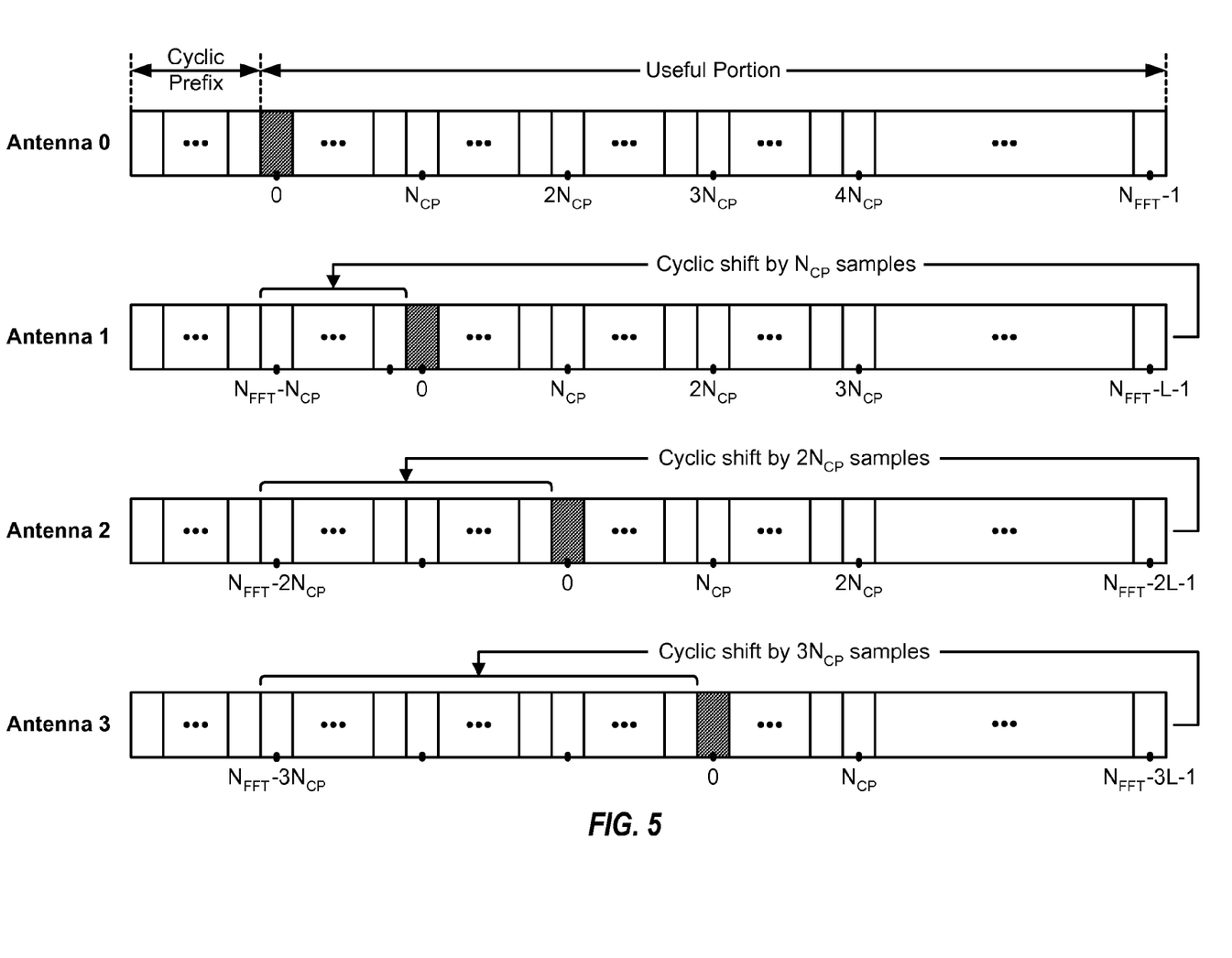
FIG. 5 illustrates an example cyclic delay diversity (CDD) transmission scheme for a wireless system with M=4 transmit antennas in accordance with certain embodiments of the present disclosure.

FIG. 5 shows cyclic delay diversity with applied cyclic shifts from equation (1) for an illustrative example of M=4 transmit antennas. Transmit antenna 0 may have a cyclic shift of zero, and useful portion may be cyclically shifted/delayed by zero samples for this transmit antenna. Transmit antenna 1 may have a cyclic shift of $N_{CP}$, and the useful portion may be cyclically shifted by $N_{CP}$ samples for this transmit antenna. Transmit antenna 2 may have a cyclic shift of $2N_{CP}$, and the useful portion may be cyclically shifted by $2N_{CP}$ samples for this transmit antenna. Transmit antenna 3 may have a cyclic shift of $3N_{CP}$, and the useful portion may be cyclically shifted by $3N_{CP}$ samples for this transmit antenna.

In general, the cyclic shifts (delays) for the M transmit antennas may be selected as follows:

$$t_{m+1} - t_m \geq N_{CP}, \text{ for } m=0, \ldots, M-2. \tag{2}$$

Equation (1) is a special case of equation (2), with $t_{m+1} - t_m = N_{CP}$. The design in equation (2) ensures that $d_l + t_m$ is distinct for all values of l and m. Channel estimation for all L paths from all M transmit antennas (which is referred to as complete channel estimation) is possible without ambiguity, where $L \leq N_{CP}$. If the cyclic shifts for the M transmit antennas are standardized or a priori known, then there is no need to explicitly send signaling for cyclic shifts.

Figure 6:
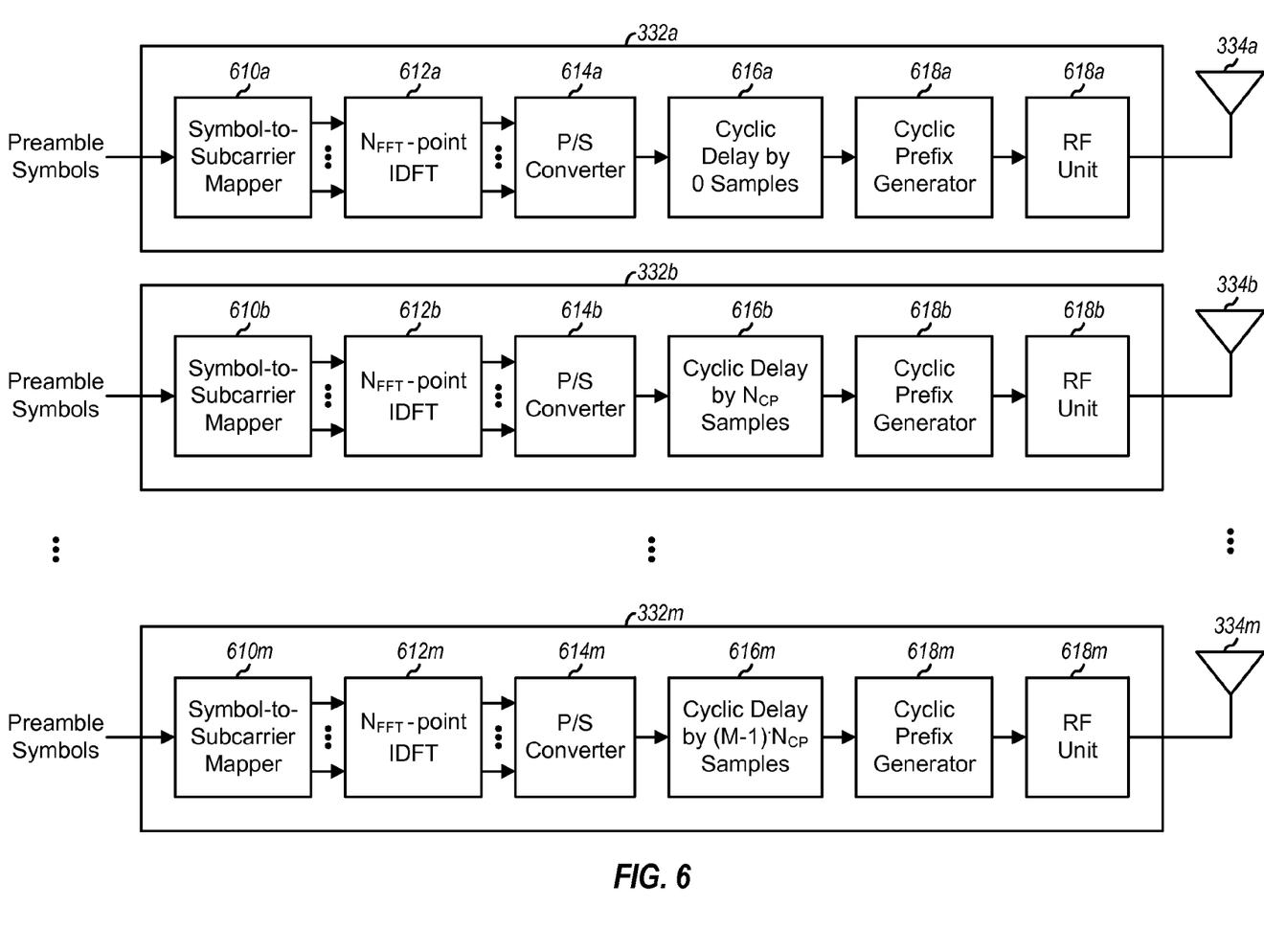
FIG. 6 illustrates an example block diagram if a design of modulators at the base station of FIG. 3 in accordance with certain embodiments of the present disclosure.

FIG. 6 shows a block diagram of a design of modulators 332a through 332m at base station 110 in FIG. 3. For simplicity, FIG. 6 shows only the processing to generate preamble for M transmit antennas. Base station 110 may transmit preamble symbols from M transmit antennas in a manner to facilitate channel estimation by the subscriber station 120. The preamble symbols may be sent on S subcarriers, where in general $S \leq N_{FFT}$. Within modulator 332a for transmit antenna 0, a symbol-to-subcarrier mapper 610a maps preamble symbols to preamble subcarriers and maps zero symbols to remaining subcarriers. An IDFT unit 612a performs an $N_{FFT}$-point IDFT on the $N_{FFT}$ preamble and zero symbols and provides $N_{FFT}$ time-domain samples. A P/S converter 614a serializes the $N_{FFT}$ samples. A cyclic delay unit 616a cyclically shifts the $N_{FFT}$ samples by 0 samples for transmit antenna 0. A cyclic prefix generator 618a appends a cyclic prefix and provides an OFDM symbol comprising a first preamble for transmit antenna 0.

Modulator 332b may similarly generate an OFDM symbol comprising a second preamble for transmit antenna 1. However, a cyclic delay unit 616b cyclically shifts the $N_{FFT}$ samples by $N_{CP}$ samples for transmit antenna 1. Each remaining modulator 332 may similarly generate an OFDM symbol comprising a preamble for corresponding transmit antenna but may cyclically shift the $N_{FFT}$ samples by $m \cdot N_{CP}$ samples for transmit antenna m.

In order to determine antenna configuration at the base station, different preamble sequence for every supported number of transmit antennas may be utilized as the primary synchronization signal. As an illustrative example, if one, two and four antennas are supported at the base station, then it may be required to reserve three different preamble sequences as primary synchronization signals. In order to accurately detect the number of transmit antennas, the preamble sequences may be generated such that autocorrelation between cyclic shifts of same sequence is equal to zero and cross-correlation between cyclic shifts of distinct sequences is nearly equal to zero.

In the Long Term Evolution (LTE) and Worldwide Interoperability for Microwave Access (WiMAX) standards, a set of Constant Amplitude and Zero Auto Correlation (hereinafter abbreviated as CAZAC) sequences may be used as pilot sequences for channel estimation following the primary synchronization between mobile subscriber and base station. In this disclosure, the CAZAC sequences are utilized to determine the number of transmit antennas during the primary synchronization. After that, by correlating received samples with delayed version of transmitted CAZAC sequences and by knowing the number of transmit antennas, it may be possible to recover the channel impulse response between every transmit and every receive antenna.

Figure 7:
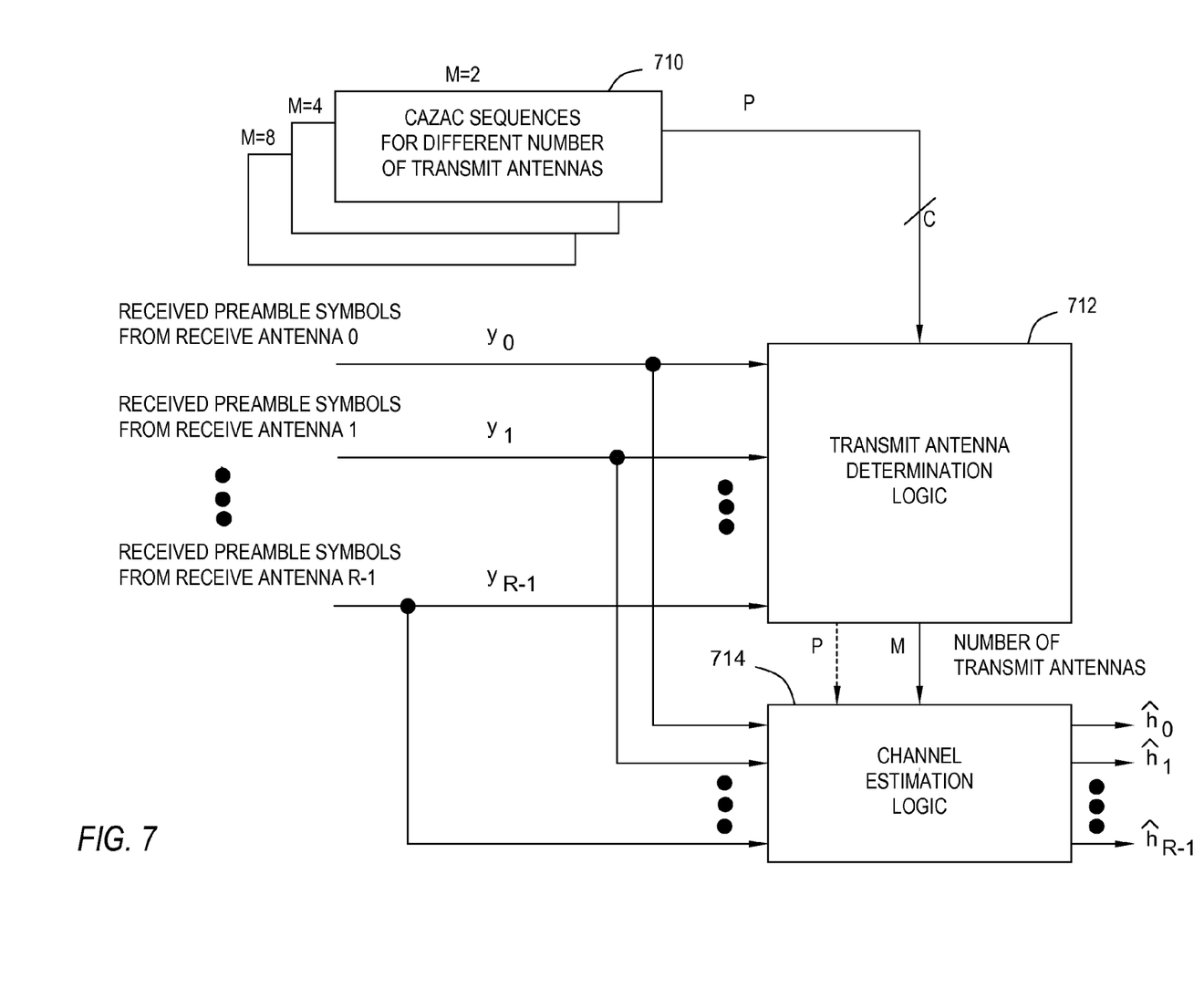
FIG. 7 illustrates an example block diagram of a detector at a subscriber station for determining the number of antennas used at the base station and for estimating MIMO channels during primary synchronization in accordance with certain embodiments of the present disclosure.

Exemplary MIMO Preamble for Initial Access with an Unknown Number of Transmit Antennas As described herein, for certain embodiments, a base station may apply transmit diversity during primary synchronization by transmitting a preamble sequence from a plurality of transmit antennas. The particular preamble sequence may be selected to indicate the number of transmit antennas used to transmit the sequence. As a result, a mobile station may simultaneously obtain synchronization and determine the number of transmit antennas. With knowledge of the number of transmit antennas, the mobile station may perform MIMO channel estimation based on knowledge of the transmission scheme used to transmit the preamble sequence FIG. 7 shows a block diagram of a detector capable of determining a number of antennas used to transmit a preamble sequence, based on the sequence itself. After determining the number of transmit antennas, the detector may perform MIMO channel estimation. For certain embodiments, the preamble sequences transmitted from the base station may be designed to allow the detector to decode the preamble sequences using Constant Amplitude and Zero Auto Correlation (CAZAC). CAZAC sequences possess a feature that autocorrelation between cyclically shifts of same CAZAC sequence is equal to zero, and cross-correlation of cyclic shifts of two different CAZAC sequences is nearly equal to zero.

The $N_{FFT}$ received preamble symbols for each receive antenna j in FIG. 7 may be expressed as:

$$y_j = P \cdot h_j + n, \tag{3}$$

where $y_j$ is an $N_{FFT} \times 1$ vector of observations for $N_{FFT}$ samples on receive antenna j, P is an $N_{FFT} \times M \cdot N_{CP}$ matrix of CAZAC preamble sequences for $N_{FFT}$ preamble samples, and $h_j$ is a $M \cdot N_{CP} \times 1$ vector of channel gains for M transmit antennas, and n is a $M \cdot N_{CP} \times 1$ noise vector. Vector $h_j$ may be defined as:

$$h_j = \begin{bmatrix} h_{j,0} \\ h_{j,1} \\ \vdots \\ h_{j,M-1} \end{bmatrix}. \quad (4)$$

The first $N_{CP}$ elements $h_{j,0}$ from equation (4) represent channel gains for transmit antenna 0, the next $N_{CP}$ elements $h_{j,1}$ represent channel gains for transmit antenna 1, and so on, and the last $N_{CP}$ elements $h_{j,M-1}$ represent channel gains for transmit antenna M-1. An $(N_{FFT} \times M \cdot N_{CP})$ matrix P of CAZAC preamble sequences from equation (3) for a plurality of M transmit antennas may be defined as follows:

$$P = [p_0 \, p_1 \ldots p_{M-1}], \quad (5)$$

where $p_m$ is the matrix of size $N_{FFT} \times N_{CP}$, and represents a CAZAC preamble sequence for the transmit antenna m composed of up to $N_{CP}$ cyclic shifts of the $N_{FFT}$ preamble samples. Matrices $p_m$, m=0, 1, ..., M-1, are composed of cyclic shifts of the original preamble sequence by $m \cdot N_{CP}$ to $(m+1)N_{CP}-1$. Different CAZAC preamble sequences may be utilized for different supported number of transmit antennas resulting in different values of the matrix P. If C different antenna configurations are supported at the base station, then C different matrices P may be defined in the system, as illustrated by block 710 in FIG. 7 for an exemplary case of C=3. Since the number of transmit antennas M is not known a-priori, the value of M may be fixed to a maximum number $M_{max}$ of antennas supported in the system.

The transmit antenna determination logic 712 may correlate received preamble symbols at any receive antenna j with a plurality of CAZAC sequences that correspond to all supported number of transmit antennas:

$$P^H \cdot y_j, \quad (6)$$

where matrix $P^H$ is Hermitian version of matrix P from equation (5). Correlation defined by equation (6) may be repeated C times for all C supported number of transmit antennas, where P is unique for the particular configuration of transmit antennas.

Making use of the fact that the autocorrelation between cyclic shifts of a given CAZAC sequence is exactly zero and that the cross-correlation between cyclic shifts of two different CAZAC sequences are nearly zero, one can figure out which preamble sequence was actually transmitted using the CDD scheme described above. If the preamble hypothesis in the correlation given by equation (6) matches the actual preamble sent, then the correlation provides the vector of channel taps between all transmit and the $j^{th}$ receive antenna. If the preamble hypothesis does not match the actual preamble sent, the correlation given by equation (6) will provide a vector with each position containing a linear combination of all channel taps between all transmit and $j^{th}$ receive antenna. These two cases can be distinguished by comparing the peaky behavior of the correlation output.

Therefore, the number of transmit antennas M may be determined without ambiguity at the output of the transmit antenna determination logic 712. The CAZAC sequence that corresponds to the particular determined number of transmit antennas M and cyclically shifted with all a priori known (standardized) shift values $t_0$ through $t_{M-1}$ that satisfy condition in equation (2) may be applied to the channel estimation logic 714 and correlated with received preamble symbols from all R receive antennas.

Because the autocorrelation of CAZAC sequences with different cyclic shifts provide zero result and the CDD scheme may be utilized for the transmission, a single-input single-output (SISO) channel between each transmit and each receive antenna in a communication system may be determined without ambiguity at the output of the channel estimation logic 714.

Figure 8:
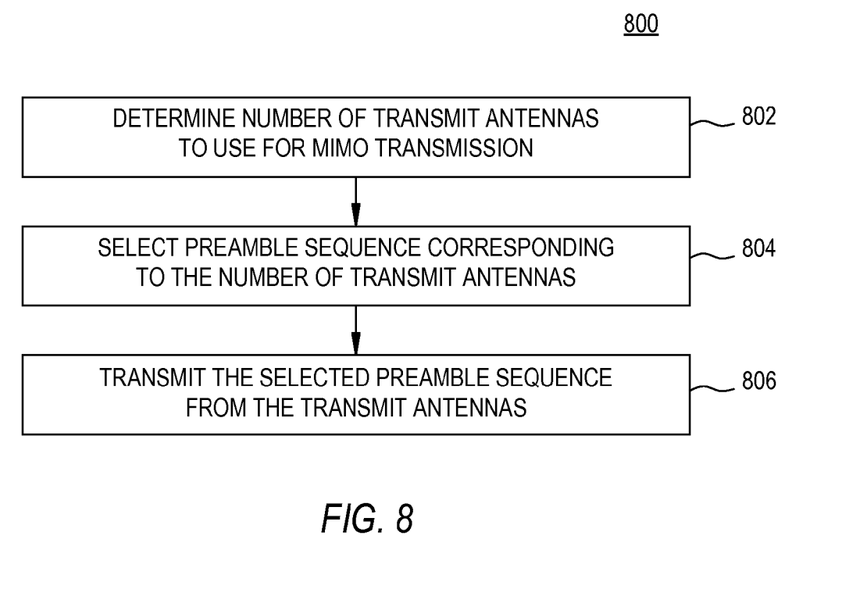
FIG. 8 illustrates example operations for transmitting a preamble sequence using transmit diversity, with the sequence indicating the number of transmit antennas used, in accordance with certain embodiments of the present disclosure.

FIG. 8 illustrates example operations 800 for transmitting a preamble sequence using transmit diversity, with the sequence indicating the number of transmit antennas used, in accordance with certain embodiments of the present disclosure. The operations 800 may be performed, for example, by a base station 110 to transmit the preamble sequence from a plurality of transmit antennas via a CDD scheme using a group of modulators, such as those shown in FIG. 6.

The operations begin, at 802, by determining a number of transmit antennas to use for a MIMO transmission. For example, the base station may be configured to transmit using $2^N$ antennas (e.g., 1, 2, 4 or 8). At 804, a preamble sequence corresponding to the determined number of antennas is selected and, at 806, the selected preamble sequence is transmitted from the number of antennas. Upon successful decoding of the preamble sequence, a receiving mobile station is able to know the number of transmit antennas and may, thus, be able to perform MIMO channel estimation.

Figure 9:
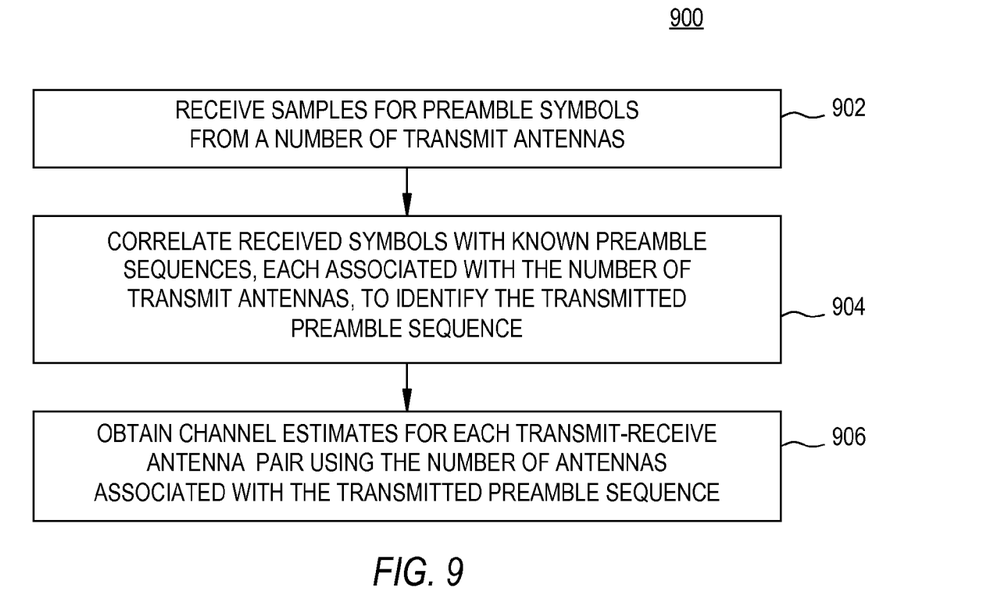
FIG. 9 illustrates example operations for determining the number of transmit antennas used at the base station and for estimating MIMO channels during primary synchronization, in accordance with certain embodiments of the present disclosure.

FIG. 9 illustrates example operations 900 that may be performed, for example, at a mobile station receiving the transmitted preamble sequence. At 902, samples for preamble symbols are received from a number of transmit antennas. At 904, a correlation is performed on the received symbols with known preamble sequences, to identify the transmitted preamble sequence.

As described above, the $m^{th}$ preamble sequence may be generated based on the $m^{th}$ cyclic delay and sent from the $m^{th}$ transmit antenna, where m=1, 2, ..., M. Thus, a received demodulated preamble sequence at the first receive antenna may be correlated with CAZAC sequences that correspond to all C supported number of transmit antennas. For example, CAZAC sequences that are not cyclically shifted (or, equivalently, cyclically shifted by zero samples) may be used at the receiver. As a result of correlation, unique information about the number of utilized antennas at the transmitter may be determined.

At 904, using the number of antennas, channel estimates may be obtained for each transmit-receiver pair. For example, with the number of transmit antennas known, corresponding CAZAC preamble sequence cyclically shifted by all predefined cyclic shift values may be correlated with received demodulated preamble sequence at every receive antenna. As a result, estimates of channel gains between every transmit and every receive antenna may be obtained.

Figure 8A:
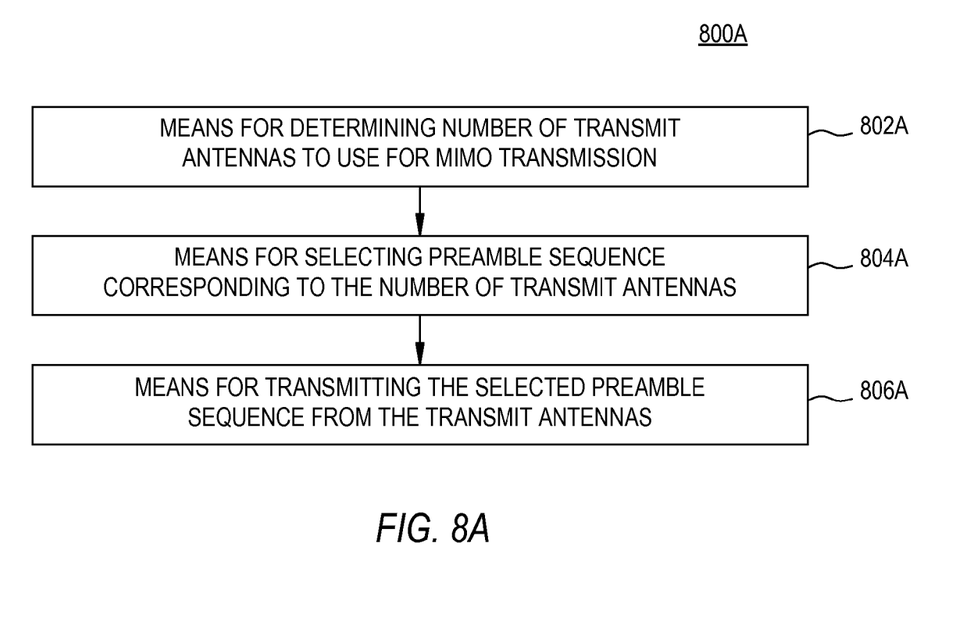
FIG. 8A illustrates example components capable of performing the operations illustrated in FIG. 8.
Figure 9A:
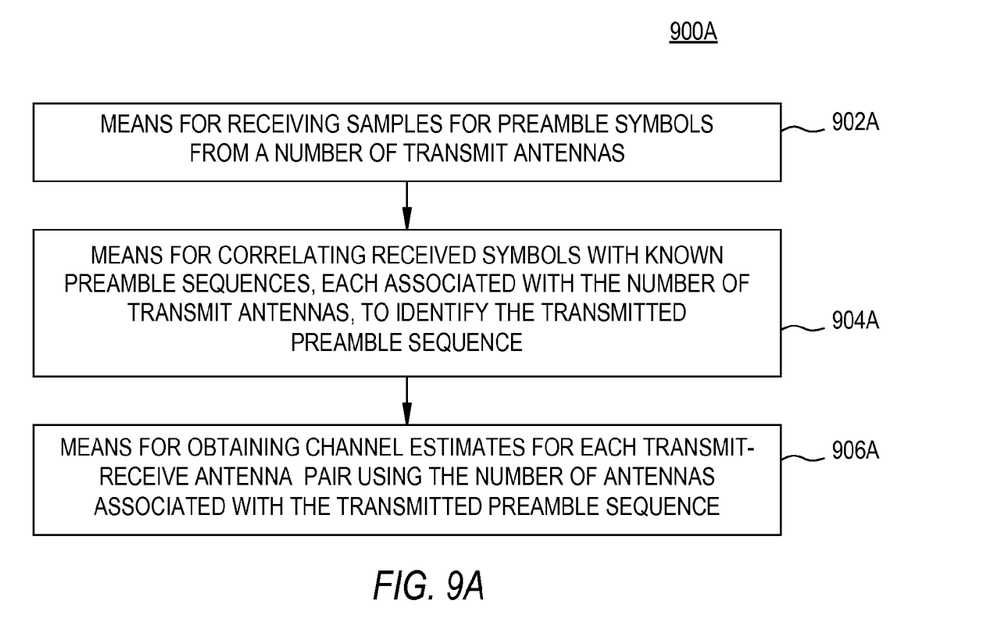
FIG. 9A illustrates example components capable of performing the operations illustrated in FIG. 9.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 802-806 illustrated in FIG. 8 correspond to means-plus-function blocks 802A-806A illustrated in FIG. 8A. Similarly, blocks 902-906 illustrated in FIG. 9 correspond to means-plus-function blocks 902A-906A illustrated in FIG. 9A.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications in a multiple input multiple output (MIMO) communications system, comprising:
    receiving, at a receive antenna, a Constant Amplitude and Zero Auto Correlation (CAZAC) preamble sequence based on symbols transmitted from a plurality of transmit antennas during an initial synchronization with a base station, wherein the CAZAC preamble sequence indicates a number of transmit antennas;
    correlating the received CAZAC preamble sequence with a plurality of known CAZAC preamble sequences, wherein each of the known CAZAC preamble sequences corresponds with a predefined number of transmit antennas;
    identifying one of the plurality of known CAZAC preamble sequences as corresponding with the received CAZAC preamble sequence based on the correlation of the received CAZAC preamble sequence with the plurality of known CAZAC preamble sequences; and
    identifying the number of transmit antennas, wherein the number of transmit antennas is the predefined number of transmit antennas associated with the identified known CAZAC preamble sequence.

2. The method of claim 1, wherein the number of transmit antennas is the number of transmit antennas used to transmit the CAZAC preamble sequence.

3. The method of claim 1, wherein the CAZAC preamble sequence is transmitted from the plurality of transmit antennas using a Cyclic Delay Diversity (CDD) transmission scheme.

4. The method of claim 1, further comprising performing channel estimation for a plurality of pairs of the receive and transmit antennas.

5. A method for wireless communications in a multiple input multiple output (MIMO) communications system, comprising:
    determining a number of transmit antennas to use for a transmission of a primary synchronization signal during an initial synchronization with a mobile station;
    selecting, from a plurality of Constant Amplitude and Zero Auto Correlation (CAZAC) preamble sequences corresponding to different numbers of transmit antennas, a CAZAC preamble sequence, wherein the selected CAZAC preamble sequence contains information about the determined number of transmit antennas, and wherein each of the plurality of CAZAC preamble sequences corresponds with a predefined number of transmit antennas; and transmitting the selected CAZAC preamble sequence as the primary synchronization signal from the determined number of transmit antennas during the initial synchronization with the mobile station.

6. The method of claim 5, wherein transmitting the selected CAZAC preamble sequence as the primary synchronization signal from the determined number of transmit antennas comprises transmitting the CAZAC preamble sequence using a Cyclic Delay Diversity (CDD) transmission scheme.

7. A device for wireless communications in a multiple input multiple output (MIMO) communications system, comprising:
   logic, implemented in hardware, for receiving, at a receive antenna, a Constant Amplitude and Zero Auto Correlation (CAZAC) preamble sequence based on symbols transmitted from a plurality of transmit antennas during an initial synchronization with a base station, wherein the CAZAC preamble sequence indicates a number of transmit antennas;
   logic, implemented in hardware, for correlating the received CAZAC preamble sequence with a plurality of known CAZAC preamble sequences, wherein each of the known CAZAC preamble sequences corresponds with a predefined number of transmit antennas;
   logic, implemented in hardware, for identifying one of the plurality of known CAZAC preamble sequences as corresponding to the received CAZAC preamble sequence based on the correlation of the received CAZAC preamble sequence with the plurality of known CAZAC preamble sequences; and
   logic, implemented in hardware, for identifying the number of transmit antennas, wherein the number of transmit antennas is the predefined number of transmit antennas associated with the identified known CAZAC preamble sequence.

8. The device of claim 7, wherein the number of transmit antennas is the number of transmit antennas used to transmit the CAZAC preamble sequence.

9. The device of claim 7, wherein the CAZAC preamble sequence is transmitted from the plurality of transmit antennas using a Cyclic Delay Diversity (CDD) transmission scheme.

10. The device of claim 7, further comprising logic for performing channel estimation for a plurality of pairs of the receive and transmit antennas.

11. A non-transitory computer-readable medium for wireless communications in a multiple input multiple output (MIMO) communications system, comprising:
   code for receiving, at a receive antenna, a Constant Amplitude and Zero Auto Correlation (CAZAC) preamble sequence based on symbols transmitted from a plurality of transmit antennas during an initial synchronization with a base station, wherein the CAZAC preamble sequence indicates a number of transmit antennas;
   code for correlating the received CAZAC preamble sequence with a plurality of known CAZAC preamble sequences, wherein each of the known CAZAC preamble sequences corresponds with a predefined number of transmit antennas;
   code for identifying one of the plurality of known CAZAC preamble sequences as corresponding with the received CAZAC preamble sequence based on the correlation of the received CAZAC preamble sequence with the plurality of known CAZAC preamble sequences; and
   code for identifying the number of transmit antennas, wherein the number of transmit antennas is the predefined number of transmit antennas associated with the identified known CAZAC preamble sequence.

12. The non-transitory computer-readable medium of claim 11, wherein the number of transmit antennas is the number of transmit antennas used to transmit the CAZAC preamble sequence.

13. The non-transitory computer-readable medium of claim 11, wherein the CAZAC preamble sequence is transmitted from the plurality of transmit antennas using a Cyclic Delay Diversity (CDD) transmission scheme.

14. The non-transitory computer-readable medium of claim 11, further comprising code for performing channel estimation for a plurality of pairs of the receive and transmit antennas.

15. The method of claim 1, further comprising:
   decoding the CAZAC preamble sequence;
   wherein identifying the number of transmit antennas comprises determining the number of transmit antennas from content of the decoded CAZAC preamble sequence.

16. The device of claim 7, further comprising:
   logic for decoding the CAZAC preamble sequence;
   wherein the logic for identifying the number of transmit antennas comprises logic for determining the number of transmit antennas from content of the decoded CAZAC preamble sequence.

17. The non-transitory computer-readable medium of claim 11, further comprising:
   code for decoding the CAZAC preamble sequence;
   wherein the code for identifying the number of transmit antennas comprises code for determining the number of transmit antennas from content of the decoded CAZAC preamble sequence.

* * * * *